Patented Apr. 5, 1932

1,852,041

UNITED STATES PATENT OFFICE

WILLARD DE C. CRATER AND JOHN C. FRENCH, OF KENVIL, NEW JERSEY, ASSIGNORS TO HERCULES POWDER COMPANY, OF WILMINGTON, DELAWARE, A CORPORATION OF DELAWARE

METHOD OF PURIFYING NITRATED POLYHYDRIC ALCOHOLS

No Drawing. Application filed September 14, 1929. Serial No. 392,739.

Our invention relates to an improvement in method for purifying and stabilizing nitrated polyhydric alcohols generally. Our invention is more particularly adaptable to the purification of nitrated dihydric and trihydric alcohols, as glycols, glycerine, and the like, which, for the purpose of our invention, are equivalents.

Heretofore, as is well known in the manufacture of nitrated products of polyhydric alcohols, such as nitrated glycols, nitrated glycerine, and the like, used more particularly in connection with the production of explosives, substantial difficulty has been met with in purifying and stabilizing the product after nitration.

Heretofore it has been customary in connection with the production of nitrated products of polyhydric alcohols to effect separation of the bulk of the nitrating acids from the nitrated products and then to wash the product with water to remove the major portion of the acids dissolved therein, then to subject the product to one or more alkaline washes to remove the remaining acids and stabilize the product. Heretofore, as a practical matter, it has been necessary to subject the nitrated product to several washings with warm alkali solution in order to obtain the desired purification and stability, which consumes considerable time, requires equipment and reduces yield, since a certain amount of the product is lost through the dissolving action of the alkaline wash thereon.

The alkaline wash method of effecting the purification and stabilization of nitrated polyhydric alcohols is expensive in view of the time element, overhead due to equipment and loss of product, wherefor numerous attempts have been made to effect purification by other methods. However, such attempts as have been made have not attained any material success.

Now, in accordance with our invention, we have found that nitrated polyhydric alcohols may be readily purified and given increased stability if the product, after separation from the nitrating acids and washing with water, be given an alkaline wash, then acidified and then given a second alkaline wash.

In the practical adaptation of our invention the nitrated polyhydric alcohol is produced in any well known manner by the nitration of the polyhydric alcohol, the nitrated polyhydric alcohol and the nitrating acids being separated in any usual manner, as for example, by gravity separation. The nitrated product, after separation from the nitrating mixture, is washed with water in the usual manner for the removal of dissolved acids and is then subjected to an alkaline wash in accordance with the usual practice, by which it is rendered substantially neutral. The nitrated product, after separation from the alkaline solution, is acidified, for example, by washing the product with an acid solution and after the nitrated product is separated from the acid solution, it is subjected to a second alkaline wash. The product, on separation from the second alkaline wash, will be found to be highly purified and to have a permanent stability greater than heretofore obtained by prior methods of treatment.

The method in accordance with our invention, as has been indicated, is applicable to the purification and stabilization of nitrated polyhydric alcohols, as dihydric, for example, glycols, trihydric, for example, glycerine, tetrahydric, as for example, erythritol, hexahydric, as for example, mannitol, and the like.

By way of illustration, for example, the method in accordance with our invention is applicable to nitroglycerin, ethylene glycol dinitrate, nitropolyglycerin-nitroglycerin mixtures, diethylene glycol dinitrate, nitroglycerin-nitrosugar mixtures, etc.

In the practical adaptation of the method embodying our invention, we may use for the acidifying, or the acid washing of the nitrated polyhydric alcohol, for example, an acid solution such as a solution of nitric, sulfuric, hydrochloric, acetic, phosphoric, oxalic, hydriodic, and the like. The acid solution is desirably of sufficient strength to impart to the nitrated polyhydric alcohol an acid reaction and may be of substantial strength, through beyond a certain point in the case of certain acids, a waste of acid will be involved or, if too great strength is used, there will be danger of accelerated decomposition of the nitrated product, which may result in explosion. The acid strength or concentration may, for example, be within the range 1%–30%, the lower limit depending upon the amount of alkali carried by the nitrated product, it being understood that the product is required to be acidified. If a strength in excess of the upper limit is used in the case of certain acids, as nitric, hydrochloric, or the like, it may result in accelerated decomposition with danger of explosion and in many cases if the strength of the acid exceeds about 15% more acid will be used than is necessary, with consequent waste.

In the practical adaptation of the method in accordance with our invention, the alkaline washing of the nitrated polyhydric alcohol may be effected through the use of an alkaline solution, as for example, an aqueous solution of sodium carbonate, sodium metaborate, trisodium phosphate, and the like, such as have been used heretofore in connection with the neutralization of nitrated products.

As a specific illustration of the practical adaptation of the method embodying our invention, for example, diethylene glycol is nitrated for the production of diethylene glycol dinitrate. The product is separated from the nitrating mixture and is given a fresh water wash which will remove nearly all of the acidity. The product is settled out from the washwater, drawn into a neutralizer and neutralized by agitation with a solution of sodium carbonate or other suitable alkali. After neutralization the product is washed with, for example, a 5% nitric acid solution, which will have the effect of turning the product acid. The product is separated from the nitric acid solution and neutralized by agitation with a soda ash solution. The product on separation from the soda ash solution will be found to be stable and to give a high heat test. For example, diethylene glycol dinitrate treated in accordance with our invention will give a KI stability test of 21' or longer at 82.2° C. as compared with a KI stability test of 2' at 82.2° C. for a similar product, after treatment with a sodium carbonate solution only. Diethylene glycol dinitrate treated in accordance with the method embodying our invention, using for example, sulphuric, hydrochloric, acetic, phosphoric, oxalic and hydriodic acids in place of nitric acid will show substantial improvement in stability, which will run from 10' to 40+' at 82.2° C.

As a further illustration of the practical adaptation of the method embodying our invention, for example, nitroglycerine may be purified and stabilized in a manner similar to that described above in connection with diethylene glycol dinitrate, the nitroglycerine after subjection to an alkaline wash and separation therefrom being acidified, as for example, by washing with a 5% solution of nitric or other acid and finally being subjected to a second alkaline wash to neutralize the acidity. The nitroglycerine purified by treatment with an alkaline wash only, as by prior methods, would show, for example, a KI stability test of 2' 30" at 82.0° C. as compared with a KI stability test of from 12–16 minutes after purification or stabilization in accordance with the method embodying our invention.

It will be understood that the method embodying our invention involves broadly the treatment of a nitrated polyhydric alcohol, as by washing with water and subjecting to an alkaline wash after separation from the nitrating mixture to render it substantially neutral, then acidifying the product and finally neutralizing, as with an alkaline wash. It will be understood that the nitrated product need not be given any particular degree of acidity, it being only essential that it be rendered acid and that it be not treated with any acid in such concentration as to dangerously accelerate decomposition, and it being desirable, of course, for the sake of economy to avoid waste of acid.

What we claim and desire to protect by Letters Patent is:

1. The method of purifying a nitrated polyhydric alcohol which includes subjecting the nitrated product to an alkaline wash, acidifying the nitrated product and subjecting the acidified product to an alkaline wash.

2. The method of purifying a nitrated polyhydric alcohol which includes subjecting the nitrated product to an alkaline wash, washing the product with a nitric acid solution and subjecting the product to a second alkaline wash.

3. The method of purifying a nitrated polyhydric alcohol which includes subjecting the nitrated product to an alkaline wash, washing the product with an acid solution of a concentration within about the range 1%–30% and subjecting the product to a second alkaline wash.

4. The method of purifying a nitrated polyhydric alcohol which includes subjecting the nitrated product to an alkaline wash, washing the product with a 5% nitric acid solution and subjecting the product to a second alkaline wash.

5. The method of purifying a nitrated glycol which includes subjecting the nitrated product to an alkaline wash, acidifying the product and subjecting the acidified product to an alkaline wash.

6. The method of purifying a nitrated glycol which includes subjecting the nitrated product to an alkaline wash, washing the product with an acid solution and subjecting the product to a second alkaline wash.

7. The method of purifying a nitrated glycol which includes subjecting the nitrated product to an alkaline wash, washing the product with a nitric acid solution and subjecting the product to a second alkaline wash.

8. The method of purifying nitroglycerine which includes subjecting nitrated glycerine to an alkaline wash, acidifying the nitroglycerine and subjecting the acidified nitroglycerine to an alkaline wash.

9. The method of purifying nitroglycerine which includes subjecting nitrated glycerine to an alkaline wash, washing the nitroglycerine with an acid solution and subjecting the nitroglycerine to a second alkaline wash.

10. The method of purifying nitroglycerine which includes subjecting nitrated glycerine to an alkaline wash, washing the nitroglycerine with a nitric acid solution and subjecting the nitroglycerine to a second alkaline wash.

11. The method of purifying nitroglycerine which includes subjecting nitrated glycerine to an alkaline wash, washing the nitroglycerine with an acid solution of a concentration within about the range 1%–30% and subjecting the nitroglycerine to a second alkaline wash.

12. The method of purifying nitroglycerine which includes subjecting nitrated glycerine to an alkaline wash, washing the nitroglycerine with a 5% nitric acid solution and subjecting the nitroglycerine to a second alkaline wash.

13. The method of purifying a nitrated trihydric alcohol which includes subjecting the nitrated product to an alkaline wash, acidifying the nitrated product and subjecting the acidified product to an alkaline wash.

14. The method of purifying a nitrated dihydric alcohol which includes subjecting the nitrated product to an alkaline wash, acidifying the nitrated product and subjecting the acidified product to an alkaline wash.

In testimony of which invention, we have hereunto set our hands, at Kenvil, N. J., on this 7th day of September, 1929.

WILLARD DE C. CRATER.
JOHN C. FRENCH.